United States Patent [19]

Levich

[11] Patent Number: 5,354,017
[45] Date of Patent: Oct. 11, 1994

[54] METHOD FOR CONTROLLING TURBULENCE

[75] Inventor: Evgeny Levich, Tel-Aviv, Israel

[73] Assignee: Orlev Scientific Computing, Ltd., Yavne, Israel

[21] Appl. No.: 176,284

[22] Filed: Dec. 30, 1993

Related U.S. Application Data

[63] Continuation of Ser. No. 54,837, Apr. 30, 1993, abandoned, which is a continuation of Ser. No. 550,020, Jul. 9, 1990, abandoned.

[51] Int. Cl.$^5$ ............................ B64C 21/00; F41F 3/04
[52] U.S. Cl. .................................... 244/204; 244/130; 244/201
[58] Field of Search ............... 244/130, 201, 203, 204, 244/200, 205

[56] References Cited

U.S. PATENT DOCUMENTS

| | | | |
|---|---|---|---|
| 3,446,464 | 5/1969 | Donald | 244/205 |
| 3,510,094 | 5/1970 | Clark | 244/130 |
| 3,598,081 | 8/1971 | Van Houten | 116/137 A |
| 3,662,554 | 5/1972 | De Broqueville | 244/130 |
| 4,516,747 | 5/1985 | Lurz | 244/204 |
| 4,741,498 | 5/1988 | Gerhardt | 244/204 |
| 4,802,642 | 2/1989 | Mangiarotty | 244/204 |
| 4,865,271 | 12/1989 | Savill | 244/130 |
| 4,932,610 | 6/1990 | Maestrello | 244/130 |

FOREIGN PATENT DOCUMENTS

1956760  7/1973  Fed. Rep. of Germany ...... 244/205

*Primary Examiner*—Michael S. Huppert
*Assistant Examiner*—Virna Lissi Ansley
*Attorney, Agent, or Firm*—Sandler, Greenblum & Bernstein

[57] ABSTRACT

Controlling turbulence in a medium caused by injection of energy into the medium at relatively large scale with consequent dissipation of energy at relatively small scale, is achieved by introducing into the medium a broad spectrum stochastic external disturbance.

51 Claims, No Drawings

METHOD FOR CONTROLLING TURBULENCE

This application is a continuation of U.S. patent application Ser. No. 08/054,837, filed Apr. 30, 1993, now abandoned, which is a continuation of U.S. patent application Ser. No. 07/550,020, filed Jul. 9, 1990, now abandoned.

TECHNICAL FIELD

This invention relates to a method for controlling turbulence in a fluid medium including, for example, turbulence created by relative movement between a body and a fluid medium, or by a shear flow between two fluids.

BACKGROUND ART

The injection of energy into a medium at a relatively large scale, such as occurs when a body is propelled in a fluid medium, develops turbulence in the medium. While turbulence in a fluid medium has the connotation of chaos in which all possible degrees of freedom are excited, it is now generally accepted that coherent patterns exist in the turbulence.

A fundamental property of developed turbulence is that, although most of the energy of turbulent motion is associated with large scales, the dissipation of energy as a consequence of the turbulent motion occurs at small scales comparable to the Kolmogoroff length scale. Such dissipation is manifested by the conversion of molecular movement into heat, and this viscous dissipation takes place mainly in the boundary layer in a fluid medium which exists between a body and the fluid, or between, for example, two fluids of different densities.

Between the large scales where turbulent motion occurs, and the small scales where dissipation of energy occurs, lie intermediate scales often referred to as the inertial range. Energy is transmitted from the non-dissipative large scales to the dissipative small scales through the inertial range scales which thus serve as an energy transmission bridge.

The dissipation of energy due to turbulence, e.g., turbulence created by relative movement between a body and a medium is manifested in different ways. In the case of pipeline transportation of fluid, the dissipation is evidenced by downstream pressure loss; in the case of aircraft flight, or underwater submarine movement, the dissipation is evidenced by increased drag. Flame propagation, and heat transfer associated with turbine blades, as well as often violent, geophysical phenomena such as tornadoes, may constitute additional modalities in which energy injected at relatively large scales, is dissipated due to turbulent flow at small scales.

The usual approach to controlling turbulence and reducing frictional losses in fluid flow is concentrated on improving the finish of surfaces in contact with a fluid. Limits are soon reached, however, on the extent to which surface finish can suppress incipient turbulence. In pipeline transportation of liquids, suppression of turbulence is conventionally achieved by releasing a polymer or surfactant into the liquid boundary layer. The presence of the polymer is believed to modify the boundary layer of flow adjacent to the inner surface of the conduit carrying the liquid, and as a consequence, the momentum of flux is reduced which, in turn, reduces frictional losses. This approach to the suppression of turbulence is appropriate, however, only in cases where a suitable polymer is compatible with the liquid being transported. Moreover, this approach is applicable to only a limited number of flow situations, and its application is furthermore complicated by rapid fatigue of the added substances.

It is therefore an object of the present invention to provide a method for controlling turbulence that is of general application to many modalities.

BRIEF DESCRIPTION OF THE INVENTION

The present invention controls turbulence in a fluid medium by introducing a broad spectrum stochastic external disturbance into the medium. It is presently believed that this has the effect of disrupting the coherence in the inertial range and interrupting the ability of the inertial range to conduct energy from the large scales to the viscous scales where energy dissipation takes place. As a consequence, energy remains at the large scales, and viscous dissipation at small scales is reduced because less energy is supplied.

When a disturbance in a fluid medium is created by relative movement between a body and the medium such that a boundary layer is established in the medium having inertial and dissipative subranges, the present invention includes introducing the disturbance into the medium via the boundary layer. Preferably, the spectrum of said disturbance includes wavelengths in the inertial and dissipative subrange length scales.

The spectrum of said disturbance should include wavelengths at least greater than the dissipative subrange length scale. In this case, the wavelengths of said disturbance are comparable to, or larger than, the Kolmogoroff length scale. Alternatively, and preferably, the maximum wavelengths of said disturbance are comparable to the Taylor microscale or even larger scales in the inertial range.

The disturbance may be an essentially white noise signal that may be modulated.

One of the techniques for introducing the required disturbance is to inject an essentially white noise signal into the boundary layer of the medium adjacent to the body such that the signal is coupled to and perturbs the medium. Such signal is temporally and spatially random and serves to introduce chaotic elements into the medium at a location where the wavelength of the perturbing signal is comparable to the dissipation length scale which is related to the scale of the energy containing eddies in the motion. That is to say, the average wavelength of the perturbing signal is comparable to the size of the eddies in the viscous sublayer portion of the boundary layer. Specifically, the average wavelength of the perturbing signal can be substantially equal to the Kolmogoroff length scale for the flow. Alternatively, the average wavelength can be substantially equal to the Taylor microscale. In such a case, the effect will be larger.

The invention is applicable to the operation of a vessel in a body of fluid, such as a submarine under water, an aircraft in the atmosphere, or to the control of other turbulent shear flows and homogeneous turbulence. Specifically, in the first two cases, an essentially white noise disturbance is introduced into the boundary layer of the fluid adjacent the vessel, the central frequency of the noise being chosen to enhance propulsion of the vessel in the body of fluid by introducing a chaotic perturbation into the boundary layer. The dynamics of coherent patterns or structures in the turbulence, by which energy is transferred in cascade fashion from larger eddies to smaller eddies (i.e., from a region of small wave numbers in the flow to a region of large wave numbers), can be destroyed by small scale, high frequency forcing.

When the fluid is conductive, such as seawater in the case of a submerged submarine, coupling of the external signal to the fluid for effecting its perturbation can be achieved by creating an appropriate randomly varying in time and space electromagnetic field in the boundary layer adjacent to the skin of the vessel. When the fluid is air, coupling can be achieved by creating an appropriately varying time and space sonic field within the boundary layer.

DETAILED DESCRIPTION

Turbulence in a flow field created by relative movement between a body and a medium, or by shear between fluids, involves eddies in the field which vary from large to intermediate and small in a direction toward dissipation. Such turbulence can be thought of as a mechanism which converts low entropy energy present in large eddies with a few degrees of freedom into high entropy energy present in small eddies with a large number of degrees of freedom. Thus, turbulence results in an energy cascade that produces high entropy energy that is disposed of in the small dissipation scales In the boundary layer, turbulent dissipation predominately takes place in the viscous sublayer (i.e., dimensions associated with regions of the flow within which molecular interactions result in the dissipation of turbulent energy). Coherent organization of large scales in the turbulent flow, is sustained by disposal of the accumulation of high entropy energy. In other words, a long range topological order is induced by energy dissipation at small scales, at the same time that chaos is precluded.

The above-described results are achieved through the formation of self-similar fractal geometry for the velocity derivative fields in physical space. The latter is observed as intermittency which is seen by an observer as a small scale property manifested by means of highly non-uniform space and time distributions of energy dissipation, Reynolds stresses, enstropy (vorticity squared), and its generation, etc. Coherence in turbulence is associated by some observers with regular patterns or vorticity lumps present in all turbulence shear flows. In conjunction with intermittency, turbulence in a flow field has coherent structures. Fundamentally, coherence is caused by helicity-associated generic phase coherence, helicity being a measure of topological entangledness of the vorticity field lines, and being a pseudo-scalar as well as inviscid invariant.

The existence of turbulence is inseparable from the vortex line stretching process which in turn implies a growth in the surface area of a sheet at which vorticity differs from zero in the limit of very large Reynolds numbers. This process is associated with certain values of the dimensionless parameter conventionally called skewness. Skewness usually has a measured value between 0.4 to 0.5 for developed turbulence. It is this growth of the surface area which is unambiguously related to the entropy growth. Thus, the vorticity surface growth through the formation of fractal can be seen as a manifestation of the second law of thermodynamics.

According to the present invention, the helicityassociated phases in the inertial range close to small dissipation scales are randomly shuffled, resulting in a destruction of fractal fine scale within the inertial range. The corresponding small scales thus become out of tune with the larger ones and diffusion through the volume of the medium results. Consequently, the fractal surface acquires width. Because the volume of vortical motion is an inviscid invariant due to Kelvin's Theorem of Circulation, the relevant area of fractal decreases. As a consequence, the growth of entropy at small scales is impeded and slowed, while the growth of entropy at small scales diminishes and more energy would stay at large scales whose organization also changes.

In the best mode for carrying out the invention, a broad spectrum, stochastic external disturbance is introduced into the turbulent fluid medium wherein the maximum wavelengths of said disturbance are comparable to the Taylor microscale, or even larger scales in the inertial range of the turbulent flowing fluid.

The theory discussed above finds practical application in suppressing turbulence, in particular, in a medium where the turbulence is created by relative movement between a body and the medium. Such disturbances should be random in both time and space (e.g., white noise) in order to introduce a chaotic factor into the coherent organization of the small scales particularly in the boundary layer. The term "small dissipation scales" is a term well known in the art of fluid dynamics, and is used here in its conventional sense. In boundary layer turbulence, it means the thickness of the viscous sublayer wherein molecular interaction effects the dissipation of turbulent energy by heat. Such thickness is comparable to the Kolmogoroff length scale. Also, the terms inner and outer parts of the boundary layer are conventional. Preferably, the disturbance should be introduced, in accordance with the present invention, into at least a portion of the inner part of the boundary layer adjacent the viscous sublayer. The term "inertial range" is likewise conventional and means the intermediate scales between the large energy containing and small dissipative scales. A characteristic scale of the inertial range is the Taylor microscale. Preferably, the typical wavelength of the perturbation signal should be no larger than the Taylor microscale.

In a practical case, such as operating a vessel in a body of fluid (e.g., operating a ship or submarine at sea), the chaotic perturbation into the boundary layer can be in the form of an essentially white-noise disturbance whose center frequency is chosen such as to enhance propulsion of the vessel in the body of fluid by reducing the effects of turbulence. Preferably, where the fluid is conductive, such as sea water, the noise is introduced into the boundary layer near the vessel surface by generating a time and space wideband varying electro-magnetic field in the boundary layer. Because of the conductivity of the water, the field interacts with the water causing a perturbation and randomization of the vortex lines in the boundary layer in synchronism with the excitation signal. Hence, the noise spectrum should preferably be chosen in conjunction with the turbulent energy spectrum. The result is that an inverse cascade of energy ensues and the dynamics of the coherent structures associated with large scale turbulence is disturbed thereby reducing small scale turbulence and dissipation in the boundary layer. Propulsion of the vessel in the water is thus enhanced by the expenditure of a small amount of energy in the perturbing magnetic field.

Where the fluid is air, and the vessel is an aircraft, the noise can be introduced into the boundary layer by generating a time and space varying wideband sonic signal within the boundary layer. The center wavelength of the sonic signal is comparable to the small-scale structure of the turbulence; and the sonic signal may be created using a series of transducers located on the wing surface of the aircraft, or in operative relationship thereto.

Various mechanical means may also be provided for introducing the desired perturbation into the boundary layer. For example, an array of extensions such as small wires extending into the boundary layer may be excited under the combined action of the flow and their own elasticity in resisting the flow to provide the desired perturbation. If preferred, an array of ferromagnetic extensions, such as wires, or additives such as particles moving in the boundary layer, being acted upon by a temporally and spatially varying high frequency electromagnetic field can be used to interact with the turbulent fluid and produce such excitations.

These approaches can also be used to reduce the turbulent drag or pressure drop of a fluid flowing in a pipe. Thus, for example, small wires having elastic properties and of a length at least of the Kolmogoroff length scale, or Taylor microscale may be attached to the inner surface of the pipe such that the wires extend into the boundary layer and provide the desired perturbation. As a consequence, the turbulent drag or pressure drop of the fluid flow will be reduced.

In a direct numerical simulation of turbulence having a characteristic Taylor microscale Reynolds number in the range of 26-30, it has been shown that the skewness of turbulence, a dimensionless measure of vorticity stretching, was reduced by 25% to 70% of its usual value when random perturbations in accordance with the present invention were applied to scales containing between 1% to 20% of the turbulent energy (i.e., in the range of scales larger than the Kolmogoroff scale. The effectiveness of such steps is increased as the Reynolds number increases.

I claim:

1. A method for controlling turbulence in a flow field in a medium having relatively large scale eddies of size L characterized by a Reynolds number $Re_L$ much greater than unity containing most of the turbulent energy, there being a consequent transmission of energy to relatively small scale eddies having a size comparable to the Kolmogorov scale $I_k$ and a Reynolds number $R_e$ equal to unity, at which dissipation of energy occurs, the scales L and $I_k$ being relates by the expression $L=I_k^*(Re_L) 0.75$, said method comprising introducing into the medium a broad spectrum stochastic external disturbance a plurality of whose wavelengths are in the range of scales intermediate the scales L and $I_k$ thus reducing energy dissipation.

2. Am method according to claim 1 wherein said turbulence is created by relative movement between a body and said medium such that a turbulent boundary layer is established in the medium having an inner and outer part, and a viscous sublayer whose thickness is comparable to the Kolmogorov scale $I_k$ and whose Reynolds number $RE_k$ is equal to unity, said method including introducing said disturbance into the medium via the boundary layer.

3. A method for controlling turbulence in a flow field caused by injection of energy into a medium at relatively large scales, which have a size L characterized by a Reynolds number $Re_L$ much greater than unity, containing most of the turbulent energy, there being a consequent transmission of energy to relatively small scales, which have a size comparable to the Kolmogorov scale $I_k$ and a Reynolds number $Re_k$ equal to unity, the scales L and $I_k$ being related by the expression $L=I_k^* (Re_L) 0.75$, at which dissipation of energy occurs, said transmission of energy being through an inertial range intermediate said relatively large scales and said relatively small scales, said method comprising introducing into the medium a broad spectrum stochastic external disturbance most of whose wavelengths are no less than the dissipative length scales thus reducing energy dissipation.

4. A method according to claim 1 wherein the spectrum of said disturbance includes wavelengths at least greater than the dissipative length scales.

5. A method according to claim 1 wherein the typical wavelengths of said disturbance are greater than the Kolmogoroff length scale.

6. A method according to claim 1 wherein the typical wavelengths of said disturbance are comparable to the Taylor microscale.

7. A method for operating a vessel in a fluid by introducing into the boundary layer of the fluid in the region adjacent the vessel, a broad spectrum stochastic external disturbance for enhancing propulsion of the vessel in the fluid, a plurality of the wavelengths of the disturbance being no less than the dissipative length scales, which have a size comparable to the Kolmogorov scale $I_k$ and a Reynolds number $R_e$ equal to unity, thus reducing the energy dissipation.

8. A method according to claim 1 wherein said disturbance is modulated.

9. A method according to claim 2 wherein the medium is a fluid, and the body is a pipe carrying the fluid, the disturbance being introduced into the fluid by injecting the broad spectrum disturbance into the turbulent boundary layer of the fluid adjacent to the pipe, the disturbance being such that it is coupled to the fluid in the described manner and interacts therewith.

10. A method for operating a vessel in a fluid by introducing into the boundary layer of the fluid in the region adjacent to the vessel, a broad spectrum, stochastic external disturbance for enhancing propulsion of the vessel in the fluid, a plurality of wavelengths of said disturbance being in the range of scales intermediate the large energy containing scales which have a size L characterized by a Reynolds number $Re_L$ much greater than unity, and the small energy dissipation scales, which have a size comparable to the kolmogorov scale $I_k$ and a Reynolds number $Re_k$ equal to unity, the scales L and $I_k$ being related by the expression $L=I_k^* (Re_L) 0.75$ thus reducing the energy dissipation.

11. A method according to claim 10 wherein the fluid is conductive, and the disturbance is introduced into the boundary layer of the fluid adjacent to the vessel by a time and space varying magnetic field.

12. A method according to claim 10 wherein the fluid is seawater.

13. A method according to claim 10 wherein the fluid is air.

14. A method according to claim 13 wherein the disturbance is introduced into the boundary layer of the fluid by a time and space varying sonic field.

15. A method according to claim 12 wherein the disturbance is introduced into the boundary layer of sea water adjacent to the vessel by mechanical means.

16. A method according to claim 13 wherein the disturbance is introduced into the boundary layer of air adjacent to the vessel by mechanical means.

17. A method according to claim 10 wherein said disturbance is introduced into the fluid by an array of extensions having ferromagnetic properties acted on by a randomly fluctuating magnetic field.

18. A method according to claim 10 wherein said disturbance is introduced into the fluid by particles having ferromagnetic properties acted on by a randomly fluctuating magnetic field.

19. A method according to claim 9 wherein said disturbance is introduced into the fluid by an array of extensions having elastic properties.

20. A method according to claim 9 wherein said disturbance is introduced into the fluid by an array of extensions having having ferromagnetic properties acted on by a randomly fluctuating magnetic field.

21. A method according to claim 9 wherein said disturbance is introduced into the fluid by particles having ferromagnetic properties acted on by a randomly fluctuating magnetic field.

22. A method according to claim 1 wherein the taylor microscale Reynolds number is at least 26.

23. A method according to claim 22 wherein the skewness of turbulence, which is a measure of vorticity stretching, is reduced by 70% or less of its measured value in turbulence.

24. A method according to claim 2 wherein said disturbance is introduced at least into a portion of the inner part of said boundary layer.

25. A method according to claim 1 wherein the spectrum of said disturbance includes wavelengths in the inertial range.

26. A method according to claim 10 wherein the spectrum of said disturbance includes wavelengths in the inertial range.

27. A method according to claim 1 wherein said wavelengths are in the inertial range.

28. A method according to claim 17 wherein said turbulence is crated by relative movement between a body and a medium so as to establish, in the medium, a boundary layer having an inertial range and dissipative scales, said method including introducing said disturbance into the medium via the boundary layer.

29. A method according to claim 27 wherein the spectrum of said disturbance includes wavelengths greater than at least the dissipative length scales.

30. A method according to claim 27 wherein typical wavelengths of said disturbance are greater than the Kolmogoroff length scale.

31. A method according to claim 27 wherein the typical wavelengths of a said disturbance are greater than the Taylor microscale.

32. A method according to claim 28 wherein typical wavelengths of said disturbance are greater than the dissipative length scales.

33. A method according to claim 28 wherein typical wavelengths of said disturbance are greater than the Kolmogoroff length scale.

34. A method according to claim 28 wherein typical wavelengths of said disturbance are greater than the Taylor microscale.

35. A method according to claim 27 wherein said disturbance is modulated.

36. A method according to claim 27 wherein the medium is a fluid flowing in a pipe, the disturbance being introduced into the field by injecting the disturbance into the boundary layer of the fluid adjacent the pipe, the disturbance being such that it is coupled to the fluid and interacts therewith.

37. A method according to claim 10 wherein most of the wavelengths are in the inertial range intermediate the large and small scales for disrupting coherence of the flow in said inertial range thus reducing the energy dissipation.

38. A method according to claim 37 wherein the fluid is conductive, and the disturbance is introduced in the boundary layer of the fluid adjacent the vessel by a magnetic field that varies in time and space.

39. A method according to claim 37 wherein the fluid is sea water.

40. A method according to claim 37 wherein the fluid is air.

41. A method according to claim 40 wherein the disturbance is introduced into the boundary layer of the fluid by a sonic field that varies in time and space.

42. A method according to claim 39 wherein the disturbance is introduced into the boundary layer of sea water adjacent the vessel by mechanical means.

43. A method according to claim 40 wherein the disturbance is introduced into the boundary layer of air adjacent the vessel by mechanical means.

44. A method according to claim 37 wherein the disturbance is introduced into the fluid by an array of extensions having ferromagnetic properties acted upon by a randomly fluctuating magnetic field.

45. A method according to claim 37 wherein the disturbance is introduced into the fluid by particles having ferromagnetic properties acted on by a randomly fluctuating magnetic field.

46. A method according to claim 36 wherein the disturbance is introduced into the fluid by an array of extensions having elastic properties.

47. A method according to claim 36 wherein the disturbance is introduced into the fluid by an array of extensions having ferromagnetic properties acted upon by a randomly fluctuating magnetic field.

48. A method according to claim 36 wherein the disturbance is introduced into the fluid by particles having ferromagnetic properties acted on by a randomly fluctuating magnetic field.

49. A method according to claim 31 wherein the Taylor microscale Reynolds number is at least 26.

50. A method according to claim 49 wherein the skewness of turbulence, which is a measure of vorticity stretching, is reduced by 70% or less of its usually measured value in turbulence.

51. A method according to claim 28 wherein said disturbance is introduced into a portion of the inner part of said boundary layer. disturbance is introduced into the fluid by an array of extensions having elastic properties.

* * * * *